Feb. 16, 1965   J. W. HENDRY   3,170,009
METHOD FOR RENDERING A PLASTIC WORKING MACHINE SELF-CLEANING
Filed June 25, 1963
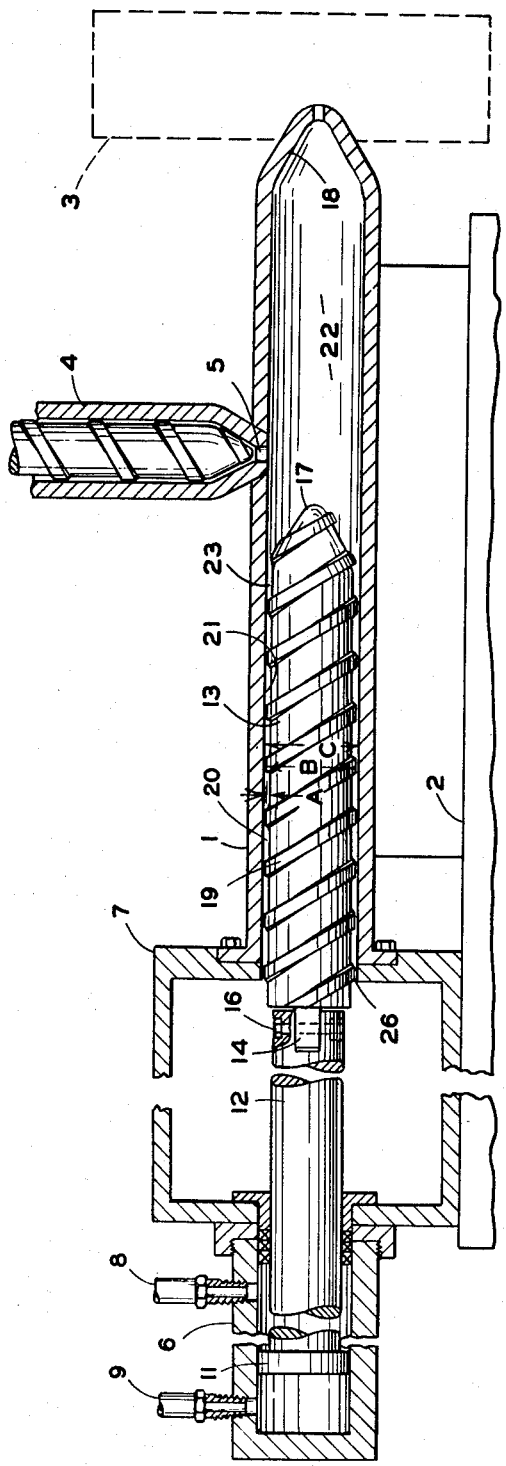
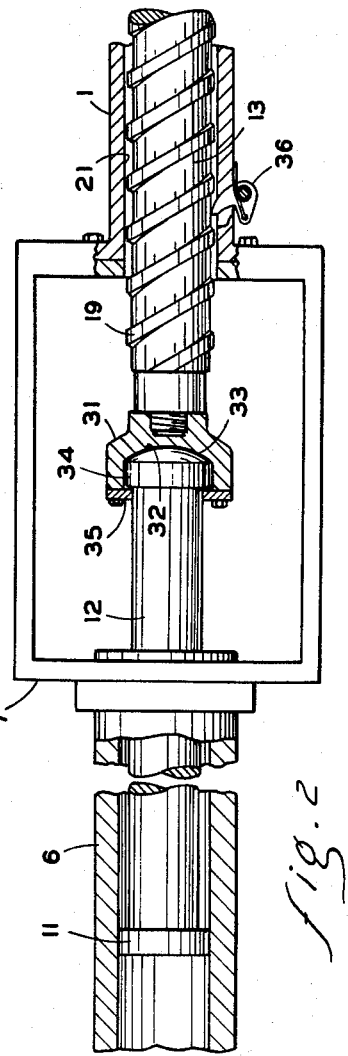
INVENTOR.
JAMES W. HENDRY
BY
Woodhams, Blanchard and Flynn
ATTORNEYS

United States Patent Office 3,170,009
Patented Feb. 16, 1965

3,170,009
METHOD FOR RENDERING A PLASTIC WORKING MACHINE SELF-CLEANING
James W. Hendry, Scottsburg, Ind., assignor to Borg-Warner Corporation, Chicago, Ill., a corporation of Illinois
Filed June 25, 1963, Ser. No. 290,560
3 Claims. (Cl. 264—39)

This invention relates to a method for plastic molding in a machine using a ram-type feeder and particularly to a type thereof which utilizes the pressure created by action of the ram on the plastic material for rotating said ram and rendering the apparatus self-cleaning. This application is a continuation-in-part of my application Serial No. 120,269, filed June 28, 1961, now Patent No. 3,115,681, and assigned to the same assignee as is the present application.

In the injection molding of the majority of presently utilized plastic materials, it is recognized that a certain amount of such material works back between the opposing surfaces of the ram and the injection chamber and the presence of such material is in many instances relied upon to effect lubrication of said ram and prevent the metal surfaces from contacting and thereby scoring each other. With most presently used plastic materials, this presents no difficulty inasmuch as the materials are not normally subject to degradation even under the prolonged exposure to heat which they experience between the ram and surrounding cylinder. However, when the machine is operating on a plastic material which is more readily subject to degradation upon either exposure to excessive heat or exposure to normal molding temperature for an excessive period of time, then plastic material which works back between the ram and the surrounding wall of the injection cylinder becomes degraded. Often the degraded material, by this time usually black in color, may then work back into the plastic mass being molded and become entrained therein, resulting in an unattractive discoloration, or at least flecking, of the molded parts.

Previous attempts to solve this problem have relied upon the provision of a relatively wide space between the injection ram and the adjacent cylinder walls in order to insure the constant movement of sufficient plastic material outwardly from the injection cylinder for the purpose of preventing such degraded material from returning into the body of material being molded. However, this is not only difficult to control and wasteful of both plastic material and power, but it still does not work particularly successfully inasmuch as material which is squeezed into the space between the ram and surrounding walls of the injection chamber and partially degraded therein may still be returned into the mass to be molded upon subsequent actuation of the ram.

Therefore, the objects of the invention are:

(1) To provide a method for insuring the presence of sufficient plastic material in the zone between a reciprocating ram and the walls of a surrounding cylinder to effect lubrication therebetween but preventing the return of degraded plastic material from such zone into the mass of plastic material being molded.

(2) To provide such a method wherein the injection ram, or at least portions thereof, are permitted to fit snugly against the surrounding cylinder walls.

(3) To provide a method, as aforesaid, which will require only a minimum of such plastic material for such lubricating purposes.

(4) To provide a method, as aforesaid, which will insure that any plastic material entering into the zone between the ram and the surrounding cylinder walls will continue to move away from the mass of plastic material being handled and will be eventually discharged from said cylinder.

(5) To provide a method, as aforesaid, which will in no way interfere with the injecting function of an injection ram.

(6) To provide a method, as aforesaid, which may be practiced by apparatus of extreme simplicity so as not to add appreciably either to the original cost of the equipment or to its operating or maintenance cost.

(7) To provide a method, as aforesaid, which may be practiced by apparatus which will be fully reliable in operation.

Other objects and purposes of the invention will become apparent to persons acquainted with devices of this general type upon reading the following specification and an inspection of the accompanying drawings.

In the drawings:

FIGURE 1 shows in central, longitudinal section a view of a typical plastic injection machine fitted with apparatus capable of practicing the method of the invention.

FIGURE 2 shows a fragment of a modification.

*General description*

In general, the invention consists of providing a reciprocable ram, such as an injection ram, with a spiral screw thread thereon and arranging said ram on the parts connected thereto in such a manner that such ram is free to rotate only in response to forward movement thereof in the injection cylinder, particularly, in response to back pressure exerted thereon by the material being injected into the mold. Said rotation may be effected either by permitting the entire structure associated with said ram including the piston within the cylinder to rotate or a suitable rotation permitting coupling may be provided between the plunger of the cylinder and the ram. The back pressure of plastic material being expelled from the cylinder will act against the spiral thread on said ram causing same to rotate through at least a few degrees of rotation with each expelling stroke and said rotation will act through said threads to cause plastic material previously present between the ram and the surrounding cylinder walls to move backwardly to a point of discharge.

*Detailed description*

In connection with the detailed description of typical apparatus capable of practicing the method of the invention certain terminology will be used for convenience in reference but which will be understood as for descriptive purposes only and not limiting. Further it will be understood that the following description of the structure and operation of certain apparatus has been selected as a convenient and appropriate means of acquainting those skilled in the art with the method of the invention. It is recognized that said method may be practiced by other apparatus and reference to the particular apparatus hereinafter described will be recognized as for illustrative purposes only. Further, for convenience in illustration, the particular apparatus herein referred to is assumed to be used in connection with an injection molding operation. However, it will be appreciated that the method of the invention may be equally applicable to a ram-type feed for an extrusion device so that the hereinafter-mentioned references to injection equipment will also be understood as illustrative only and not limiting.

The terms "rightward" and "leftward" will refer to rightward and leftward directions in the accompanying drawings. The terms "forward" and "rearward" will refer respectively to the discharge end of the cylinder and the pressure-fluid-cylinder end of the cylinder. Said terms will also include derivatives of the words above specifically mentioned as well as words of similar import.

Turning now to the drawings in more detail, there is shown for illustrative purposes a typical injection cylinder 1 mounted in any suitable manner on a convenient base 2 and operatively connected with a mold indicated schematically at 3. Any convenient means are provided for introducing plasticized material into the interior of said injection cylinder, such means being for example a screw-type preplasticizing unit 4 of the type shown in more detail in the patent of Goldhard 2,505,540 or, means as shown in my copending application Serial No. 120,268 wherein such preplasticized material is introduced through the entrance port 5. A pressure fluid cyinder 6 is fastened in any convenient manner, such as by connecting structure 7, rigidly to the injection cylinder 1 and said cylinder 6 is supplied with pressure fluid at one or the other end thereof through the conduits 8 and 9. Said pressure fluid cylinder 6 contains a conventional piston 11 reciprocably mounted therein and rigidly affixed to the usual rod 12.

All of the foregoing is conventional and of itself forms no part of the present invention and is set forth solely for illustrative purposes. Accordingly, it will be recognized that same may be varied widely within the scope of the invention and the selection of the particular apparatus so illustrated will be recognized for illustrative purposes only and not limiting.

Turning now to the injection ram structure, there is provided a ram 13 affixed rigidly at 14 to the piston rod 12 in any conventional manner, such as by means including bolt 16 and in this embodiment having a tapered nose portion 17 to fit the correspondingly internally tapered end 18 of the injection cylinder. A plurality of spiral threads 19 are provided on said injection ram, preferably extending the full length thereof. Said threads are, however, of very small radial extent, a typical dimension for the extent of said threads beyond the root diameter thereof, and indicated by the dimension A in the drawing, being approximately 0.005 inch for a ram of 46 inches in length and 3 inches in diameter exclusive of said threads. The diameter of the ram including the threads provides a close sliding fit with the wall 21 defining the injection chamber. In the specific illustrated embodiment, the diameter "B" is 3.062 inches and the diameter "C" is 3.068. The pitch of the threads may vary widely. In the illustrated embodiment, there is shown a double thread having a 2 inch pitch, and discharged to any suitable receptacle or other means as convenient.

Alternatively, the structure may be thought of as a ram of diameter indicated at "B" above and having a shallow spiral groove 20 of depth "A" extending from one end thereof to the other. For reference purposes, the entrance to said groove located adjacent the curved tip 17 may be termed the "entrance" thereof and the portion of said groove adjacent the leftward end of said ram may be termed the "discharge" thereof. The length of the threaded portion of the ram is preferably greater than the distance between the discharge port of the injection cylinder and the point of introduction thereinto of the plasticized plastic material. Thus, when the ram is in its fully extended position, the entire distance from such point of introduction to the discharge port will be spanned by the threaded zone of the ram.

Rod 12 is preferably made of smaller diameter than the diameter of the ram to permit easy escape of plastic material which may be discharged from the leftward end of the threaded portion of the ram when same is in its extended (rightward) or partially extended position. Thus, any such material which reaches the leftward end of the threaded portion of the ram will upon retraction thereof be immediately and positively removed from the injection cylinder. As will become more clear as the description proceeds, the specific depth and pitch of these threads will be such, having in mind the viscosity of the plastic material being handled and the resistance existing in the mechanism to rotation of said ram within said casing, that as the ram is driven against the plastic material with the pressure necessary to effect suitable ejection of the plastic material from said injection chamber into a mold, said plastic material will exert a back pressure against said threads to effect a slight rotation of said ram. It will be apparent that if the pitch of said threads is too small, said ram will not rotate at all and it will be equally apparent that if the pitch and/or height of said threads is too great, then said ram will rotate excessively as it is urged against the plastic material. The dimensions above given illustrate one satisfactory embodiment for use with materials of relatively high viscosity such as unplasticized polyvinyl chloride or such as poly-oxy-methylene and acrylonitrile, butadiene and styrene copolymers.

It should be emphasized that in the embodiment of the invention shown in FIGURE 1, which is the preferred embodiment, there is provided no positive means whatever for effecting rotation of the ram and that such rotation is accomplished solely by the reaction thereupon of plastic material when said ram is placed under pressure against such plastic material. Further, even in the form of the invention shown in FIGURE 2 and hereinafter described, where the rotation created by the reaction pressure of the plastic material upon the ram is assisted by mechanical means, there is still provided no positive rotation of the ram as such as the rotation is brought about solely as the result and consequence of its forward movement to effect an expelling of plastic material from the cylinder.

*Operation*

The operation of the apparatus as a whole is conventional in that the pressure cylinder 6 retracts the injection ram 13 to the position shown in the drawing whereupon the plasticizing means 4 injects into the rightward end 22 of the injection cylinder a measured quantity of plastic material which has been plasticized and is ready for molding. When said chamber is filled, the preplasticizing device 4 stops and the pressure cylinder 6 is actuated to move the injection ram 13 rightwardly. Said ram thus injects plastic material into the mold 3 in the usual manner.

However, as the ram is urged rightwardly and builds pressure within the mass of plastic material located in the zone 22 of the injection cylinder, said pressure pushes plastic material into the space 23 between the main body of the injection ram and the surrounding wall 21. As such plastic material is forced into said space 23, it acts against the spiral threads 19 and imposes a rotating motion onto said injection ram. The cross section of the injection ram being circular, and the piston 11 within the pressure fluid 6 also being circular, said ram is capable of rotating and accordingly reacts to the pressure on threads by effecting a slight rotation simultaneously with each injection stroke. As said ram continues to rotate with each injection stroke, the plastic material which previous to any given stroke was urged into said space 23 is by said given stroke moved leftwardly. Thus, said threads 19 are both driven and driving threads in a sense that the two or three rightwardmost of said threads receive pressure from the plastic material within the injection zone 22 and react thereto to effect a rotation of said ram, while the remaining ones of such threads act on the plastic material located therebetween and drive said plastic material rearwardly. Thus, with each stroke of the injection ram, a small quantity of plastic material is moved into the space 23 between the ram body and the surrounding wall 21 and the plastic material already within said space is moved rearwardly a small distance. In a typical application, the ram rotates approximately 5 degrees with each stroke and the plastic material held between the threads thereof moves rearwardly a proportionate difference. Thus, there is no possibility that any appreciable amount of plastic material which has once entered into the space 23 can ever be returned to the injection zone 22 and accordingly the material which is driven into the mold is protected from contamination by any degraded material within the space 23. Instead, such material is positively urged rearwardly by the threads 19 and is eventually ejected out from the injection cylinder at the rearward end 26 thereof.

It will be recognized that only a small amount of such plastic material is needed within the space 23 to effectively lubricate the injection ram with respect to the injection cylinder wall 21 and hence the relatively shallow space between the root diameter and the wall 21 is ample for the purposes required. Such space may be deeper or may be even shallower than the 0.003 inch above mentioned according to the viscosity of the plastic material being handled in a given case and according to the amount of plastic material which needs to be conducted rearwardly past said ram to provide the desired lubrication.

The presence of plastic material in contact with the cylinder wall 21 in the zones between the several threads 19, is sufficient to provide proper lubrication for the entirety of said ram. The spreading of such plastic is assisted by the partial rotation of the ram with each injection stroke. Further, the likelihood of the walls of the cylinder being scored by the ram is diminished by the rotation of the ram and such rotation helps to hold the ram centered.

*Modification*

In the foregoing example it was assumed that the rod 12 and piston 11 would rotate satisfactorily within the structure supporting same. In some installations this may not be feasible. In such case, there may be placed some type of rotation permitting means between the rod 12, and the injection ram 13. One such means is illustrated in FIGURE 2 wherein an injection ram 13 is connected to a pressure fluid cylinder rod 12 by suitable rotation permitting means 31. In the specific embodiment here illustrated, said rotation permitting means 31 constitutes a pair of thrust surfaces 32 and 33. A shoulder 34 on the plunger 12 cooperates with a flange 35 suitably attached to the means 31 to retract the injection ram 13. Antifriction means, not shown, may be placed between the thrust surfaces 32 and 33 if desired.

Thus, even though the plunger 12 and parts associated fixedly therewith are for any reason held against rotation, or if the load thereon prevents the proper rotation thereof, the injection plunger 13 is still permitted to rotate with respect to the injection cylinder 1. If desired, a rotation assisting device 36, such as a spring latch, may be provided for actuation when the ram is advancing to engage the threads 19 on said ram as same moves forwardly and thereby assist rotation of said ram in response to its forward or injecting movement. This will be useful in certain instances where it is desirable to work plastic material back through and past the ram at a more rapid rate than is possible when the ram is rotated solely by the reaction force of the plastic material on the forward threads thereof. Upon retraction of said ram, the latch is ineffective.

Although particular preferred embodiments of apparatus appropriate for carrying out the steps of the invention have been disclosed in detail hereinabove for illustrative purposes, it will be understood that variations and modifications of such disclosure, which lie within the scope of the appended claims, are fully contemplated.

What is claimed is:

1. A method of molding plastic material which comprises the steps of:
    placing plastic material within a cylinder in front of a ram therein;
    moving said ram forwardly with said cylinder to eject plastic material therefrom through the forward end of said cylinder;
    utilizing the reaction pressure of said plastic material against said ram for simultaneously rotating said ram;
    utilizing the rotation of said ram for moving a small quantity of said plastic material rearwardly in said cylinder between said cylinder and said ram to serve as lubricant for said ram; and
    discharging plastic material from the rearward end of said cylinder.

2. A method according to cliam 1 in which:
    said rearwardly moving quantity of material is moved through a spiral path and the end walls of said path are moved by rotation of said ram in such a direction as to move said quantity of material toward the rearward end of said cylinder.

3. A method of molding plastic material which comprises the steps of:
    placing plastic material within a cylinder in front of a spirally threaded ram therein;
    moving said ram forwardly within said cylinder to eject plastic material therefrom through the forward end of said cylinder;
    utilizing the reaction pressure of said plastic material against said ram for simultaneously rotating said ram and thereby moving a small quantity of said plastic material rearwardly in said cylinder between said cylinder and said ram to serve as a lubricant for said ram; and
    discharging plastic material from the rearward end of said cylinder.

References Cited in the file of this patent

UNITED STATES PATENTS

| | | |
|---|---|---|
| 2,243,968 | Lester | June 3, 1941 |
| 2,302,873 | Lester | Nov. 24, 1942 |
| 2,551,439 | Kovacs | May 1, 1951 |
| 2,890,491 | Hendry | June 16, 1959 |